Aug. 30, 1966  E. B. WESTLAKE, JR  3,270,114
METHOD OF MOLDING MATERIAL TO ONE END OF
A PREFORMED THERMOPLASTIC TUBE
Filed Jan. 8, 1962

INVENTOR.
EDWARD B. WESTLAKE JR.
BY Dybvig & Dybvig
HIS ATTORNEYS

United States Patent Office 3,270,114
Patented August 30, 1966

3,270,114
METHOD OF MOLDING MATERIAL TO ONE END
OF A PREFORMED THERMOPLASTIC TUBE
Edward B. Westlake, Jr., 307 Lincoln Ave.,
Havertown, Pa.
Filed Jan. 8, 1962, Ser. No. 164,935
5 Claims. (Cl. 264—263)

This invention relates to a method of manufacturing a molded article and more particularly to the method of molding a polyethylene preformed tube to a flanged member of a cap or a bag, wherein the tube is united to the flange, whether it be simply a flange or the flange of a cap or the flange-like portion of a bag, although not necessarily so limited.

An object of this invention is to connect a plastic tubular member to a flanged member or a flanged portion, so as to provide a perfect seal between the end of a preformed tubular member and the flange or flange-like portion. This has been accomplished by inserting a tube upon a cylindrical projection of a mold member, the cylindrical projection having a diameter substantially equal to the inside diameter of the tube and inserting a complementary mold member having a hole for the tube and cooperating with the first mold member in providing a cavity. A plastic that is compatible with the plastic material of the tube is injected while hot into the mold cavity to fill the same. This injected plastic is fused to the end of the tube to form a homogeneous structure.

Other objects and advantages reside in the construction of parts, the combination thereof, the method of manufacture and the mode of operation, as will become more apparent from the following description.

Figure 1:
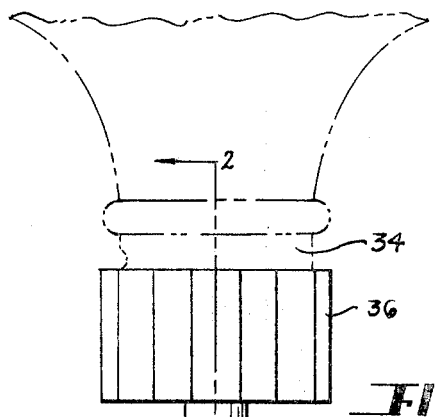

In the drawings, FIGURE 1 is a side elevational view of a cap member applied to a bottle or a container shown in phantom.

Figure 2:
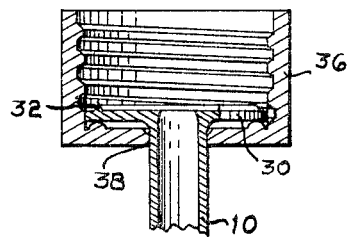

FIGURE 2 discloses a cross sectional view, taken substantially on the line 2—2 of FIGURE 1.

Figure 3:
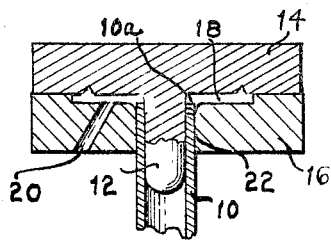

FIGURE 3 discloses a cross section of the mold, showing the cavity and a tube inserted in position ready for injection molding.

Figure 4:
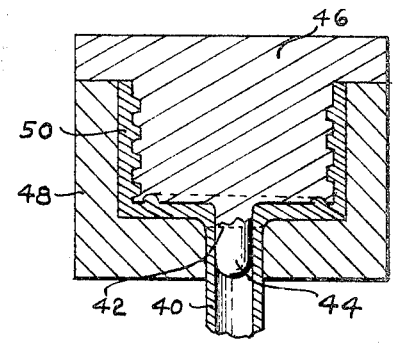

FIGURE 4 discloses a sectional view of the tube that has been molded to a cap before removal of the mold members.

Figure 5:
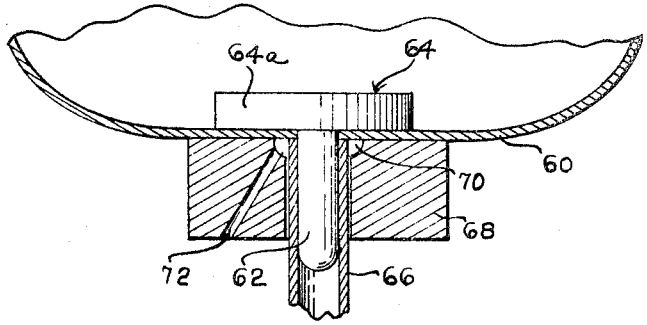

FIGURE 5 is another cross sectional view, showing a bag with the tubular member inserted into a mold in readiness for injection molding to weld the bag to the tube.

Referring to the drawings, member 10 is a polyethylene tube. It is desirable to connect this tube either to a cap or to a flange forming a gasket within a cap, the cap being attached to a container, the gasket member sealing the margins of the flanged member to the bottle or container.

This tube 10 is mounted upon a tubular projection 12 of a mold member 14, cooperating with a mold member 16 loosely surrounding the end of the tube, so as to provide a mold cavity 18. By injection molding hot polyethylene through an aperture 20 in the mold member 16, the cavity 18 is filled with the polyethylene plastic, this polyethylene while hot being fused to the end 10a of the tube. The tube and the flange consist of a homogeneous material. The polyethylene, although it is under pressure, does not escape between the wall 22 of the mold member 16 and the tube 10, for the reason that as soon as the polyethylene begins to creep through this slight opening, the adjacent mold portion cools the polyethylene so as to arrest the flow thereof. A flange 30, as best seen in FIGURE 2, is thus formed. This flange has an upwardly directly annular rib 32 which is seated against the end of the container 34, shown in phantom in FIGURE 1.

A cap 36 is provided with an aperture 38 for the tube 10. The polyethylene is sufficiently elastic so that when the cap is screwed and tightened on the end of the container, the flange 30 is sealed to the end of the container. This cap member may be made from any suitable material, either metal or plastic. The outer end (not shown) of the tube 10 is preferably sealed, so that the tube, in reality, forms a stopper.

In the modification disclosed in FIGURE 4, a tube 40, originally terminating as indicated by the dotted line 42, is inserted upon the tubular projection 44 of a mold member 46 cooperating with a mold member 48 surrounding the end of the tube and forming a cavity used in injection molding. Again, polyethylene may be used for the tube and the molding material. By this arrangement, the cap 50, upon being removed from the mold, may be threadedly attached to a container for liquid. The outer end of the tube being sealed, the cap and tube cooperate to form a stopper.

In some cases, it may be desirable to attach a polyethylene bag provided with an aperture to a tube. This has been shown in FIGURE 5, wherein a bag 60 is provided with an aperture, through which a tubular projection 62 of a mold member 64 passes. The mold member 64 may consist of a annular flange 64a contacting the adjacent wall of the bag. The tube 66, also made of polyethylene, is inserted upon the end of the projection 62 and either abuts or is brought into close proximity to the bag 60. A mold member 68 cooperates with the mold member 64 to provide an annular recess or cavity 70, associated with the passage 72. The bag is firmly clamped between the mold members. The portion of the bag adjacent the aperture forms one side or at least one edge of the mold cavity 70. Hot polyethylene plastic material may be injected through the passage 72 to fill the annular cavity 70, the hot polyethylene plastic material being fused to the wall of the bag surrounding the aperture therein and to the end of the tube 66, so as to provide a seal for sealing the end of the tube 66 to the plastic bag 60. Being all of the parts are made from polyethylene and the hot polyethylene melting or softening the end of the tube and the immediate portion of the bag surrounding the tube, these parts are fused into a homogeneous mass. The end of the bag that has not been shown is open to permit the removal of the mold member 64. The mold member 68 is slipped out over the end of the tube 66 and the tube is then fixedly attached to the bag 60.

After the molds have been removed, the bag may be filled with any suitable fluid or liquid. Then the edges of the open end of the bag, which end has not been shown, are fused together, as is well known to those skilled in the art. The end of the tube 66 that has not been shown is also fused, so that the bag, cooperating with the tube, forms a sealed enclosure for the liquid.

By snipping off the edges of the end of the tube 66 that have been fused together, the liquid may then be emptied from the bag through the tube 66. For example, the bag 60 and the tube 66 may be used as a container for milk, the bag and the tube being inserted into a milk dispensing device, such as the milk dispensing device put out by Norris. The Norris device has a clamping arrangement functioning as a valve for closing the tube. The bag 60 collapses as the milk is withdrawn, so as to completely withdraw all of the milk in the bag through the dispensing device. When the bag has been emptied, it may be discarded and the dispensing device supplied with a new bag of milk.

This bag and tube may also be used for storing and shipping chemicals, as for example, hydrochloric acid, used in storage batteries, et cetera. Any liquid that will not react to the polyethylene bag and the polyethylene tube may be stored and dispensed from the bag and the tube.

Method

The method of forming a molded portion integral with the end of a thermoplastic preformed tube by the use of the molds described above consists of inserting the end of the tube upon one of the projections 12 or 44 or 62 either before or after the mold members have been closed. If the tube is inserted upon one of these projections before the mold members are closed, the tube is passed through the aperture of the other mold member. If the tube is inserted upon the projection of the selected set of molds after the molds are closed, the end of the tube is inserted upon the projection and passed through the aperture simultaneously.

After the molds have been closed and the mold cavity surrounds the end of the tube, a hot or dissolved thermoplastic molding material, compatible to the material of the tube, is injected into the mold cavity. The injected molding material fuses to the end of the tube to form a homogeneous structure.

Instead of using a preformed polyethylene tubular member, a solid preformed polyethylene member may have a molded portion added thereto by merely eliminating the projection from the mold assembly. The preformed solid polyethylene member may then be inserted through the aperture and polyethylene injected into the mold cavity.

Within the purview of this invention, the mold member 16, the mold member 48 and the mold member 68 may consist of two parts split or divided in a plane or planes concentric with the projection 12, the projection 42 and the projection 62, respectively.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described by invention, I claim:

1. The method of securing to one end of a preformed thermoplastic tube a flange portion utilizing a mold having a cylindrical projection and a complementary apertured mold member, the diameter of the projection being substantially equal to the inner diameter of the tube, and the diameter of the aperture being sufficiently larger to extend around the outer diameter of the tube, the two mold members cooperating to form a mold cavity surrounding the end of the tube when inserted upon the projection, said method including the steps of inserting one end of the plastic tube upon the projection, inserting the tube through the aperture in the apertured mold member, closing the mold members to form a cavity surrounding the end of the tube, injecting a plastic molding material that is compatible with the thermoplastic of the tube to form a flange portion integral with the end of the tube.

2. A method of molding a cap member upon the end of a preformed polyethylene tubular member by the use of a pair of complementary mold members, forming a cavity having an aperture extending from the cavity to the exterior of the mold members, said cavity having a contour corresponding to the contour of the cap member, a projection supported by one of the mold members concentric with and projecting through said aperture, the diameter of the projection being slightly smaller than the internal diameter of the tubular member, the diameter of the aperture being slightly larger than the outer diameter of the tubular member, said method including the steps of closing the mold members to form a mold cavity, inserting the polyethylene tubular member through the aperture and upon the projection, so that the end of the polyethylene tubular member terminates in the mold cavity, and injecting hot polyethylene into the cavity to form the cap member, the hot polyethylene fusing to the end of the polyethylene preformed member to form a molded cap portion integral with the preformed polyethylene member.

3. The method of molding a preformed bag having an aperture to a preformed polyethylene tubular member by the use of a mold member having a tubular projection substantially equal to the inner diameter of the tubular member, mold means having an aperture through which the projection extends, said mold member and said mold means forming a mold cavity, said method including the steps of inserting the projection through the aperture in the wall of the bag, inserting the preformed tubular member upon the projection, inserting molding means having an aperture slightly larger than the external diameter of the preformed tubular member so as to surround the tubular member, clamping a portion of the wall of the bag between the mold member and the mold means, one wall of the cavity consisting of the portion of the bag in the vicinity of the aperture through which the projection extends, injecting hot polyethylene into the mold cavity, the hot polyethylene fusing to the adjacent portion of the bag and to the end of the tubular member so that the bag, the injected polyethylene and the tubular member form a homogeneous union.

4. The method of molding a thermoplastic material to one end of a preformed hollow thermoplastic tube utilizing a first mold member having a surface portion and having a cylindrical projection projecting from said surface portion and a second complementary mold member having a surface portion and having an aperture extending therethrough terminating at said surface portion of said second mold member, said method including the steps of closing said mold members to form a mold cavity and inserting said projection into said aperture with said surface portions confronting one another, inserting one end of said tube upon said projection and through said aperture, and injecting into said mold cavity a plastic molding material that is compatible with the thermoplastic material from which said tube is preformed to form a molded member integral with said one end of said tube and having the shape of said mold cavity.

5. The method of molding a thermoplastic material to one end of a preformed hollow thermoplastic tube utilizing a first mold member having a surface portion and having a cylindrical projection projecting from said surface portion and a second complementary mold member having a surface portion and having an aperture extending therethrough terminating at said surface portion of said second mold member, said method including the steps of inserting one end of said tube through the aperture in said second mold member, inserting said one end of said tube upon said projection, closing the mold members and inserting said projection into said aperture to form a cavity surrounding said one end of the plastic tube with said surface portions confronting one another, and injecting into said mold cavity a plastic molding material that is compatible with the thermoplastic material from which said tube is preformed to form a molded member integral with said one end of said tube and having the shape of said mold cavity.

References Cited by the Examiner

UNITED STATES PATENTS

| 2,713,369 | 7/1955 | Strahm. | |
| 2,947,035 | 8/1960 | Baker | 264—271 |

FOREIGN PATENTS 1,200,522  6/1959  France.

ROBERT F. WHITE, *Primary Examiner.*

MICHAEL V. BRINDISI, ALEXANDER BRODMERKEL, *Examiners.*

F. MARLOWE, L. S. SQUIRES, *Assistant Examiners.*